United States Patent [19]

Case

[11] 3,846,591

[45] Nov. 5, 1974

[54] PHOTOGRAPHICALLY MAGNETIC INFORMATION STORAGE ELEMENT

[76] Inventor: Laura K. Case, 14 Lockeland Rd., Winchester, Mass. 01890

[22] Filed: Aug. 21, 1972

[21] Appl. No.: 282,206

Related U.S. Application Data

[63] Continuation-in-part of Ser. No. 862,824, Oct. 1, 1969, abandoned.

[52] U.S. Cl. ............ 179/100.1 A, 96/39, 96/48 PD, 117/237, 117/239, 274/41.4, 360/3, 360/134

[51] Int. Cl. ...... G11b 11/14, G11b 5/84, G11b 5/62

[58] Field of Search .................... 117/237, 239, 234; 179/100.1 A, 100.1 B, 100.2 A, 100.2 B, 100.3 R; 274/41.4; 346/74 MP; 96/48 PD, 39, 94, 35; 360/3, 15, 134

[56] References Cited

UNITED STATES PATENTS

| | | | |
|---|---|---|---|
| 1,152,562 | 9/1915 | Sherman | 274/41.4 |
| 1,213,150 | 1/1917 | Bullis | 274/41.4 |
| 1,882,336 | 10/1932 | Nakken | 179/100.2 A |
| 2,511,121 | 6/1950 | Murphy | 346/74 MP |
| 2,546,850 | 3/1951 | Chancenotte | 274/41.4 |
| 2,559,505 | 6/1951 | Hillier | 346/74 MP |
| 2,819,963 | 1/1958 | Hamm | 96/94 |
| 2,823,999 | 2/1958 | Hamm | 179/100.2 A |
| 3,157,500 | 11/1964 | Abbott et al. | 179/100.2 A |
| 3,223,525 | 12/1965 | Jonker et al. | 96/35.2 |
| 3,344,238 | 9/1967 | Schwartz | 179/100.2 A |
| 3,655,441 | 4/1972 | Kefalas | 117/237 |

FOREIGN PATENTS OR APPLICATIONS

| | | | |
|---|---|---|---|
| 153,300 | 2/1922 | Great Britain | 179/100.1 B |

OTHER PUBLICATIONS

Jonker et al., "Physical Development Recording System," Photographic Science and Engineering, Vol. 13, No. 2, March–April 69, pp. 38–44.

*Primary Examiner*—Raymond F. Cardillo, Jr.
*Attorney, Agent, or Firm*—Homer O. Blair; Robert L. Nathans; W. Gary Goodson

[57] ABSTRACT

A visible magnetic information storage element is produced photographically by a physical development process. Information is retrieved by sensing with suitable means for detecting a magnetic image. In a preferred system an element containing a magnetic image is passed through a uniform magnetic field whereby the magnetic material becomes uniformly magnetized. The magnetic image in the form of a variable area or variable density image is then passed by a means for detecting the magnetic flux such as a magnetic recording head. A preferred information storage element comprises a photographically prepared record comprising a visual image and a visible magnetic metallic image. Photosensitive material capable of forming a physically developable image are, for example, photoconductor materials.

13 Claims, 8 Drawing Figures

LAURA K. CASE
INVENTOR.

BY W. Gary Goodson
ATTORNEY.

LAURA K. CASE
INVENTOR.

BY W. Gary Goodson

ATTORNEY.

PHOTOGRAPHICALLY MAGNETIC INFORMATION STORAGE ELEMENT

This application is a continuation-in-part application of U.S. Ser. No. 862,824, filed Oct. 1, 1969, now abandoned.

BACKGROUND OF THE INVENTION

1. Field of the Invention

This invention relates to retrieval of stored information from a magnetic information storage element; magnetic information storage elements characterized by a magnetic material in a photographically applied image pattern; and to photographic methods and apparatus for making the magnetic information storage elements.

2. Description of the Prior Art

The storage or recording of information on a magnetic storage element is of course well known in the art and described in numerous publications including the McGraw-Hill Encyclopedia of Science and Technology, McGraw-Hill Book Company, Incorporated, New York, Volume 8, Pages 37 to 41, 1960 and the Encyclopedia of Electronics, edited by Charles Susskind, Reinhold Publishing Corporation, New York, Pages 429 to 430, 1967. The most commonly used storage element is magnetic tape which comprises a paper or plastics base material coated with a thin layer of a ferromagnetic material. The base material of most tapes is cellulose acetate, polyethylene teraphthalate, or unplasticized polyvinyl chloride less than about 2.5 mils in thickness. Special tapes having thicker or thinner bases are also manufactured for applications with unusual mechanical requirements. The base material is coated with a magnetic material, typically acicular iron oxide particles approximately 1 micron in length. In pigment form, the iron oxide (gamma $Fe_2O_3$) is mixed with a binder, a complex blend of resins and plasticizers compounded to provide maximum adherence of coating to the base material and to resist wear and abrasion of the tape surface as it passes over a recording or reproducing head.

Information is stored on magnetic tape by converting the information, such as sound waves, into electrical waves or signals. These signals are amplified and fed to a recording head. Actually an electromagnet in the recording head magnetizes the oxide-coated side of the tape in magnetic patterns corresponding to the original sounds. On playback, the procedure is reversed. Magnetic patterns on the tape cause the reproducing head to react, setting up electrical waves. These signals are amplified from approximately one MV at the playback head and fed to an output such as a loudspeaker.

In retrieving information from a magnetic storage element, noise or distortion is frequently encountered resulting from one or more sources.

A common source of distortion in magnetic tape is print-through which is the transfer of magnetism from a magnetized layer to adjacent layers of tape. In this way, a small amount of the original signal is produced in adjacent layers. This results in a pre- and post- echo when the tape is reproduced. Print-through is proportional to the time elapsed after recording and inversely proportional to the thickness of the base. The level of the print-through is usually about 50 db below the level of the signal. Distortion may also result due to magnetic relaxation, i.e., the approach of the magnetic system to its steady-state condition with corresponding loss of the magnetic pattern. This results in a reduction in output when the tape passes the reproducing head. Magnetic relaxation spontaneously occurs with the passage of time and distortion resulting therefrom may be a problem with magnetic elements stored for a prolonged period of time. An additional source of distortion may be caused by the unintentional exposure of a magnetic storage element to a magnetic field causing alteration of the magnetic pattern. Similarly, there may be complete loss of the stored information by accidentally passing the element through a magnetic field such as by passing a magnetic tape past an erase head. Any distortion due to alteration of the magnetic pattern, or information loss due to loss of the magnetic pattern is permanent and cannot be remedied except by completely recording the information on the magnetic element.

Various attempts have been made to produce visible magnetic images representing sound on films. Such systems are disclosed in U.S. Pat. Nos. 3,185,777 and 3,344,238 wherein visible magnetic images are produced by xerographic or electrophotographic processes or by conventional ink printing techniques. However, these systems suffer a number of serious limitations. Because of the demand for high fidelity of sound reproduction and because of the relationship between frequency response of the pattern during playback and the resolution of the visible magnetic image it is necessary that a high resolution image be obtained. Printing, electrophotographic and xerographic processes have serious limitations in providing images of high resolution. Furthermore, these printed images suffer from ink creeping across the intended outline of the pattern on its carrier due to pressure exerted by the printing plate during the printing process. Also printing ink and electrical toners have problems adhering to the preferred plastic and metallic supports used for magnetic tape and therefore smudging and distortion of the image readily occurs. Also it is often desirable to have magnetic tapes which are much longer than the printing plate and therefore the magnetic tape must be prepared in sections. Errors in attaching the sections to each other can cause distortions in the playback. Furthermore, these prior art systems lack continuous tone and therefore are not suitable for producing variable density magnetic tapes. The electrophotographic and xerographic processes present special problems due to the fact that the density of images is usually greater on the edges of the image as opposed to the central portions. Such variations of density result in distortions when the magnetic image is read out.

Another attempt to overcome the problem of lack of permanence of the magnetic image in conventional magnetic tape is taught in U.S. Pat. No. 2,546,850 wherein a groove is engraved in a suitable support which is then filled with a suitable magnetic material. The engraving may be performed mechanically or photographically such as by photoengraving. However, this process has serious limitations due to complex and time consuming nature of the process. The mechanical engraving taught in the patent is impractical because of the lack of resolution obtained in the resulting grooves and the lack of uniformity of the groove due to variations in the substrate as well as the wear of the grooving tool. On the other hand, photoengraving processes known to the art generally utilize a photopolymer layer on the support to be etched. This coated support is exposed and developed to remove the unhardened portions of the photopolymer layer. The support which is uncovered is then etched away by contacting with a suitable etching solution. The material to be deposited in the etched areas such as magnetic material is then so deposited. The hardened photopolymer coating remaining on the original support is then removed by scrubbing the coating in a suitable solvent for this photopolymer coating. Often there are also a number of wash steps required between the various steps mentioned above in order to get the type of quality of final images that would be required for high resolution purposes such as would be required for variable area or variable density magnetic images for sound recording. A variation of this photoengraving process is seen in U.S. Pat. No. 3,655,441 wherein a negative silver image is first formed and then the unexposed photosensitive layer is removed. Then these background areas are sensitized and seeded prior to electroless plating. Thus as can be readily seen, the photoengraving processes known in the art are very complex and hence time consuming and expensive. Additionally, in order to obtain the optimum read out and reduce "chatter," it is desirable that the magnetic read out head contact a relatively smooth magnetic surface. Utilizing the photoengraving process, it is often very time consuming and tedious to make certain that the amount of metal deposited is just as sufficient to fill the groove to produce a smooth surface. It is obviously very easy to overplate or underplate and thereby form a relief image in the final magnetic image.

STATEMENT OF THE INVENTION

A visible magnetic information storage element is produced photographically by a physical development process. Information is retrieved by sensing with a suitable means for detecting a magnetic image. The magnetic tape produced by this invention overcomes the above noted problems of distortion and information loss in conventional magnetic tapes as well as problems of resolution, adhesion to the copy medium, lack of continuous tone images, and other problems with prior art visible magnetic images. Magnetic records are made according to this invention by exposing a photosensitive copy medium imagewise to a pattern of activating radiation to produce a physically developable image and contacting this copy medium with a physical developer comprising chemically reactive, magnetic image forming materials which react selectively to form an image of magnetic material, such as metal, corresponding to a pattern of activating radiation. In a preferred system a visible magnetic tape is produced by (1) generating an electrical signal representing the wave pattern of the sound to be recorded, (2) using the signal to generate an image pattern of activating radiation for a photosensitive layer, (3) exposing the photosensitive layer to this image pattern to thereby generate sites which are capable of catalyzing physical development, and (4) contacting the copy medium with a physical developer containing magnetic image forming materials to produce a magnetic image of the sound wave pattern. Apparatus for carrying out these processes are also included in this invention. The copy medium produced by the process of this invention comprise a magnetic image, preferably of cobalt, nickel, iron, or alloys or compounds of these metals. The tape or support is preferably less than about 2.5 mils in thickness and more preferably less than about 1.5 mils in thickness. Preferred base materials are plastics such as polyester or acetate or metallic supports. Paper supports are also suitable however. An especially preferred support is the polyester film base which has been tensilized, i.e., oriented in a longitudinal direction to a greater extent than in the transverse direction. The magnetic images are adherently bonded to the support by means of a binder or by means of a chemical or physical bond between the support and the image. For example, a metallic foil having a roughened surface is coated with a suitable photosensitive material, exposed and physically developed to produce an inherently bonded image of great adhesion to the metallic support. The photosensitive layer can be removed from the support if desired in cases where the image is bonded to the support. In a preferred system, however, the images produced are substantially planographic, i.e., in the same plane as the top of the binder layer of the copy medium. This planar surface is very easily accomplished by applicant's process, thus overcoming a serious limitation of the prior art. Even where there is a slight relief from the metal deposited in the image areas, the edges of the images where the image interfaces with the binder-photosensitive layer are more rounded than the edges of images formed by prior art plating techniques, thus eliminating much of the problem of chatter in magnetic readout. However, if desired, the metallic image may be built up by physical development to produce a thick relief pattern. An especially preferred copy medium is one wherein a visual image and a magnetic image are combined on the same support. For example, movie film having a sound track down the side of the film can be easily produced by the process of this invention. Present processes for producing the movie film with a magnetic sound track is rather complicated and involved. The process of this invention has special advantages for making duplicate movie film or the like since a single exposure can reproduce the continuous tone visual image as well as a variable area or variable density magnetic image sound track. The physical development can be performed with a single imaging material or if desired the sound track could be developed with a different imaging material than the visual images. Also in this system where a photoconductor is utilized the updating ability of this system can be utilized for producing the copy media of this invention. For example, the sound track of movie film could be produced by exposure and physical development. The copy medium can then be reactivated as by storing in the dark, exposed to a visual image adjacent to the sound track and physically developed with the same or a different physical developer than the physical developer used for the sound track.

It should especially be noted that applicant has been able to eliminate steps believed to be necessary in the photoengraving processes described above by plating directly upon catalytic portions of the photosensitive layer of this invention without the necessity of removing portions of this layer. The resulting image in this invention is thus different than that of the prior art since the magnetic image areas contain photosensitive materials which have been made catalytic to physical development such as by exposure such as exposed silver halide, zinc oxide or titanium dioxide. In the preferred copy media wherein the photosensitive material is deposited in a binder the final magnetic image contains binder and photosensitive material in in addition to the magnetic materials such as cobalt or nickel. The amount of magnetic image material such as metal or metal oxides in the image areas is preferably at least about 0.3 grams per square meter and more preferably from about 1.0 to about 15 grams per square meter. The amount of photosensitive material present is preferably between about 0.001 and about 10 grams per square meter and more preferably between about 0.01 and 2.0 grams per square meter. The amount of binder present is preferably between about 0.0002 and about 30 grams per square meter and more preferably between about 0.01 and 6 grams per square meter.

The magnetic recording tape of this invention is preferably read out by a process which comprises the steps of providing a magnetic information storage element where the magnetic material is in a photographic image pattern, passing the magnetic element through a uniform magnetic field whereby the magnetic material becomes uniformly magnetized and the flux available at any point on the element is dependent upon the width or density or the magnetic material at that point, and thereafter passing the magnetized element by means for detecting magnetic flux such as a magnetic reproducing head. Alternatively, the reproducing head may be designed to provide a uniform magnetic field and passage of the magnetizable element through the uniform field will create a variation in flux within the reproducing head.

A uniform magnetic field applied to the magnetizable element of this invention having the stored information in the form of a photographic image pattern is beneficial as it uniformly magnetizes the magnetizable material with the result that a varying pattern of magnetic flux is generated due to the varying width or density of the magnetic layer displaced along the element. Magnetic relaxation with prolonged storage is no longer a problem because the magnetizable material may be magnetized by application of a uniform magnetic field immediately prior to each passage of the magnetic element past a reproducing head. Likewise, there cannot be loss of information by erasure of the magnetic element.

As an additional advantage of the invention, a multiplicity of copies may be made from a master by a rapid inexpensive photographic process. This is in contrast to the prior art procedure for making conventional high quality magnetic tape records where the process for making copies from a master is slow and involves a considerable quantity of costly electronic equipment.

The invention finds application in many fields. For example, as a non-erasable magnetic memory, the images of this invention are useful on credit cards and like identification deveices. Additionally, for computer memory storage it is possible to form high resolution magnetic images as well as high resolution magnetic images deposited upon conductive images for domain tip movement and the like.

The magnetic image of this invention may thus be in a magnetizable form or a magnetized form. The image pattern of activating radiation used to produce this magnetic image may be generated by any of the techniques known to a person skilled in the art, e.g., by means if a variable area optical recorder such as shown in U.S. Pat. No. 3,344,238, incorporated herein by reference.

The copy media of this invention are especially useful as audio tape, computer tape, video tape, or instrumentation tape.

DESCRIPTION OF THE DRAWINGS

FIG. 8 shows forming a negative optical image as an intermediate step in the process.

DESCRIPTION OF THE PREFERRED EMBODIMENTS

Figure 1:
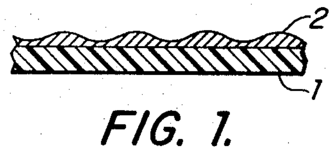
FIG. 1 is a cross-sectional view in exaggerated dimension of a magnetic tape taken lengthwise along the direction of travel of the tape and showing a magnetizable layer in a relief pattern without the photosensitive layer.

With reference to FIG. 1 of the accompanying drawings, there is shown a cross-sectional view of a magnetic information storage element in accordance with one embodiment of the invention in the form of a tape comprising a properly prepared base layer 1 and a magnetic layer 2 adherently bonded to the base layer and wherein the photosensitive layer has been removed. The base material 1 is preferably a plastic film such as cellulose acetate, polyethylene teraphthalate or unplasticized polyvinyl chloride. Linear teraphthalate ester film which has been oriented to a greater extent in the longitudinal direction than in the transverse direction is especially preferred.

The magnetizable information storage element of this invention may be in any form known in the art such as discs, tapes or the like. However, for purposes of description, the remainder of this Specification will be directed to the formation and use of information storage elements in the form of a tape.

Photosensitive materials suitable for this invention are those which upon exposure produce a physically developable image. A preferred photosensitive material comprises a photoconductor, and more preferably one dispersed in a binder. Imaging media utilizing photoconductors as the photosensitive material are known and described in U.S. Pat. No. 3,380,823 incorporated herein by reference. Exposure of such an imaging medium to actinic radiation such as visible or ultra-violet light activates the photoconductor rendering it capable of effecting chemical reactions which can be utilized to develop a visible image in the medium. The finely divided photoconductor is usually dispersed in a binder and forms a photosensitive layer on a support such as paper, metal foil, plastic, glass or the like. As known in the art, the photoconductors of greatest utility for use in such imaging media are compounds formed between metals and elements of group VIA of the Periodic Table, e.g., oxides, sulfides, selenides, and tellurides. Preferred materials from the point of view of color, light-sensitivity, ease of development and the like are titanium dioxide and zinc oxide. Zinc oxide is most preferred because of the simplicity of the process and good stability of the final imaged medium.

The photosensitive materials suitable for use in this invention are materials capable upon exposure of producing a physically developable image. Therefore, in addition to the photoconductor mentioned above, diazosulfonate, heteropolyacids, diazothioether, silver halide, methylene blue and like photosensitive materials mentioned in British Pat. Nos. 1,064,725 and 1,064,726, incorporated herein by reference are also useful. Also ferric ammonium oxalate or ferric citrate are photosensitive materials capable of producing physically developable images. Organic photoconductors such as the imidazolidinone compounds mentioned in copending U.S. Pat. No. 3,623,865, incorporated herein by reference are also useful photosensitive materials in this invention.

A physical developer as used herein includes electrolytic, electroless plating and reversible redox couple developers. Suitable systems comprise reducible metal ions such as silver ions or other ions of magnetic or magnetizable metals. The physical developer or portions thereof may be applied prior to, during, or subsequent to exposure. The metal ion containing solution may be separate from the reducing agent solution or may be in a unitary solution. one embodiment comprises contacting with a solution of metal ions to form a germ image. This germ image may then be amplified by contacting with a reducing agent, by a combination of metal ions and a reducing agent, by electrolytic or by electroless plating solutions.

Formation of a germ image suitable for amplification with a electroless or electrolytic solution may be formed by dry techniques described in the art, such as heat or light.

A magnetic material according to this invention includes any material such as metals or compounds having ferro-magnetic properties such as iron, nickel, cobalt or alloys or compounds of these metals.

The magnetic images produced according to this invention may also be used as printing plates in combination with magnetic powders or magnetic inks. The magnetic powders or inks would adhere selectively to the magnetized portions.

A magnetic image is formed by providing a photographic image on an imaging medium and metal plating directly on the photographic image. These photographic images may be either a negative or a positive of the original. An imaging medium comprising a photosensitive material capable of producing a physically developable image upon exposure is exposed and developed. The imaging medium is developed with a physical developer which is either itself a magnetizable metal or one upon which a magnetic metal may be deposited. A metal which is catalytic to the deposition of a magnetic metal is especially preferred. For example, a palladium, silver platinum or gold image may first be formed upon which is then deposited a magnetic cobalt and/or nickel image. Also by using special developers such as the reversible redox couple developer taught in Netherlands Pat. No. 6,606,262 silver germ images may, for example, be amplified with magnetic colbalt and/or nickel images.

Methods for depositing a layer of a magnetizable metal over a catalytic substrate are known in the art. Electroless deposition procedures are preferred as they do not require costly electroplating equipment. Electroless solutions of magnetic material are described in U.S. Pat. Nos. 3,305,257; 3,372,037; 3,350,210; and 3,353,986.

Typically, electroless deposition solutions such as those described in the above referenced patents comprise a source of metallic ions, mixtures of nickel, iron and/or cobalt ions being used for magnetic films, a complexing agent to maintain the metal ions in solution, typical complexing agents including Rochelle salts, tartaric acid, ammonia, and miscellaneous polyamines, a reducing agent for the metal ions, such as hypophosphite and a pH adjuster to maintain solution pH alkaline such as hydroxyl anions. The nickel, iron and/or cobalt-alloy films are chemically deposited from electroless solution by contact with a substrate composed of a metal autocatalytic to the electroless metal.

A specific procedure for preparing a storage element in accordance with this embodiment is as follows:

EXAMPLE 1

A subbed polyester film base is coated with a finely divided titanium dioxide pigment dispersed in a polyvinyl alcohol binder. The pigment to binder ratio on a weight basis is 3:1 and the total solids of the emulsion is 15 percent by weight. The film base is coated on a roller coater yielding approximately 0.40 grams of titanium dioxide per square meter. The coated film is then dried and exposed with a quartz iodine lamp at a distance of 30 inches from the target through a vacuum printing frame and a negative movie film strip having a variable area soundtrack for 2 seconds. After 10 seconds from the exposure the sample is processed with a stabilized physical developer for 3 minutes.

The physical developer is of the following formulation:

| | | | |
|---|---|---|---|
| Solution I | | | |
| | $Fe(NH_4)_2(SO_4)_2 \cdot 6H_2O$ | | 78.4g |
| | $Fe(NO_3)_3 \cdot 9H_2O$ | | 25.2g |
| | Tartaric Acid | | 80.0g |
| | $H_2O$ to 1 liter | | |
| Solution II | | | |
| | ARMAC 12D | (ionic surfactant) | 1.0g |
| | SYNTHRAPOL N | (nonionic surfactant) | 1.0g |
| | $H_2O$ to 1 liter | | |
| Solution III | | | |
| | $AgNO_3$ | | 51.0g |
| | $H_2O$ to 100 ml | | |

The bath is made up in the following ratio:

| | |
|---|---|
| Solution I | 250 ml |
| Solution II | 50 ml |
| Solution III | 6 ml |

The developed film is then placed in a tray of water at room temperature and wiped with a soft cotton pad to remove the coating. The resulting clear transparency has a maximum optical density of about 0.5. The image adhesion is tested by placing a strip of "Scotch Brand" tape over it and removing the tape with a quick pull. No silver is removed from the image area by this test.

Figure 3:
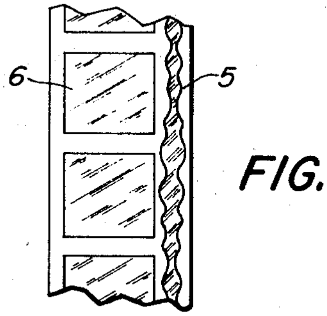
FIG. 3 is a frontal view of a film strip containing visual images and a visible magnetic metallic sound track.

The developed movie film strip having an appearance such as shown in FIG. 3 is simplified with a palladous chloride solution, then contacted with a one molar potassium chloride solution and washed thoroughly with distilled water to remove any unreacted palladous chloride. The film is then contacted with a nickel electroless plating solution of the following composition:

| | |
|---|---|
| $NiCl_2 \cdot 6H_2O$ | 0.0056 moles/l |
| $FeNH_4(SO_4)_2 \cdot 12H_2O$ | 0.0071 moles/l |
| Rochelle Salt | 0.0064 moles/l |
| $NaH_2PO_2 \cdot H_2O$ | 0.054 moles/l |
| $NH_4OH$ (28–30%) | 230 ml/l |
| pH | 10.6 |
| temperature | 65 °C |

The result of immersion in the electroless plating solution is the plating of the magnetizable metal on the palladium image areas only. The images produced are of high resolution and have a very high resistance to deterioration. The film strip is in the form of a relief as shown in FIG. 1 having image metal 1 on film base 2.

The above procedure can also be applied to an imaging medium comprising a silver halide emulsion. Alternately, silver or mercury images may be formed using aryl diazosulfonates followed by activation of the images with palladium as in Example 1 and physical development of the activated image with a magnetic material. An additional procedure would involve formation of a palladium or other noble metal image by exposure of light-sensitive iron salts such as ferric ammonium oxalate or ferric citrate or by exposure of heteropoly acids such as phosphotungstic acid followed by development with the noble metal ion and, finally, deposition of a magnetic material using either electroless or electrolytic procedures.

Figure 2:
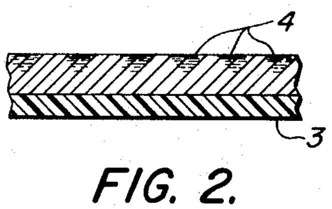
FIG. 2 is a cross-sectional view in exaggerated dimension taken lengthwise along the direction of travel of the tape and showing a magnetized layer where the magnetic material penetrates the imaging medium.

A preferred embodiment of a magnetic storage element in accordance with the invention is illustrated in FIG. 2 of the accompanying drawings where there is represented substrate 3 having a magnetic material 4 in a photographic image pattern penetrating into the imaging medium for this embodiment. An imaging medium comprising a photoconductor dispersed in a binder is imagewise exposed and developed with a physical developer. The developer comprises a source of reducible metal ions capable of yielding ferromagnetic metal upon reduction, preferably a mixture of ferrous ions (+2) and cobalt ions (+2) and a reducing agent therefor such as hypophosphite ions, amineboranes, borohydride ions, hydrazine and hydrazine derivatives and the like. The following example more fully illustrates this process.

EXAMPLE 2

An imaging medium is provided comprising a polyethylene teraphthalate substrate coated with finely divided titanium dioxide dispersed in a gelatin binder. The imaging medium is exposed to a source of activating radiation through a motion picture film having a variable area sound track immersed in a dilute silver nitrate solution and developed by immersion in an aqueous Metol developing solution having a pH of about 6.8. A low optical density silver image is obtained.

The imaging medium is then immersed for 30 seconds in a solution of 0.1 percent by weight palladous chloride containing 5 ml/l of concentrated hydrochloric acid to produce a palladium image. Thereafter, the imaging medium contacted with a one molar potassium chloride solution and rinsed thoroughly with distilled water to remove the unreacted palladous chloride. The film is then treated with an electroless plating solution such as described in Example 1 except that the $NiCl_2 \cdot 6H_2O$ is replaced with an equal amount of $CoSO_4 \cdot 7H_2O$.

The photographic images on the movie film strip are of continuous tone and the variable area sound track can be read out with an ordinary magnetic reading head. The images are of high resolution and have a high resistance to deterioration.

EXAMPLE 3

An imaging medium is provided comprising a polyethylene teraphthalate substrate coated with a finely divided titanium dioxide dispersed in a gelatin binder. The imaging medium is immersed briefly in a solution of 0.1 percent by weight palladous chloride solution containing 5 ml./l. of concentrated hydrochloric acid and then dried. A catalytic latent palladium image is then introduced by imagewise exposure of the imaging medium to activating radiation followed by extraction of excess palladous ions from the unexposed areas of the imaging medium by immersion on a 1-molar potassium chloride solution. Thereafter, the imaging medium is rinsed with distilled water and treated with the following electroless plating solution to form a magnetic image pattern within the body of the imaging medium as illustrated in FIG. 2:

| | |
|---|---|
| $CoSO_4 \cdot 7H_2O$ | 0.11 moles/l |
| $Fe(NH_4)_2(SO_4)_2 \cdot 6H_2O$ | 0.004 moles/l |
| Rochelle salt | 0.71 moles/l |
| $NH_4SO_4$ | 0.38 moles/l |
| $NaH_2PO_2 \cdot H_2O$ | 0.19 moles/l |
| KSCN | $1.5 \cdot 10^{-5}$ moles/l |
| pH | 7.8 |
| Temperature | 70°C |

The result of the immersion in the electroless plating solution is the physical development of the catalytic latent palladium image with the magnetic metal alloy only in the areas illuminated by the activating radiation. The images produced are of high resolution and have a very high resistance to deterioration.

Figure 4:
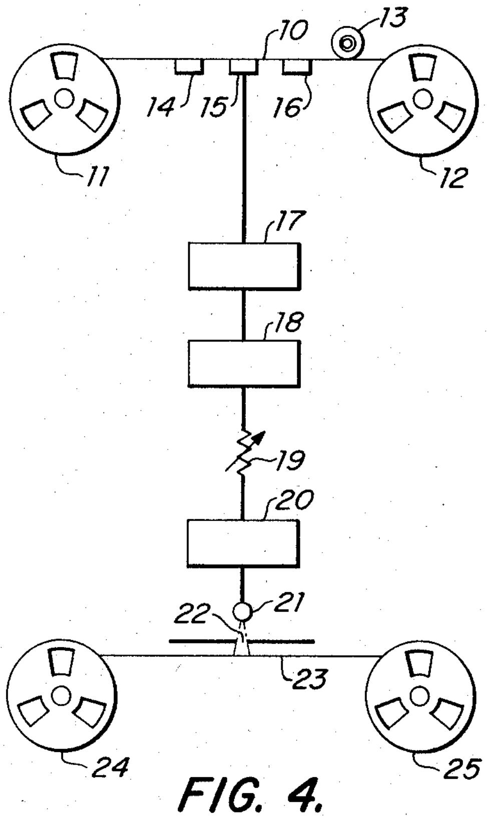
FIG. 4 is a schematic arrangement of apparatus in a complete monophonic system for reproducing a tape master.

Elements of a monophonic system for reproducing an audio tape master are shown in the schematic arrangement of FIG. 4 of the accompanying drawings. With reference thereto, there is shown a magnetic tape master 10 moving from playoff reel 11 to takeup reel 12 driven by capstan 13. The reproducing system is provided with an erase head 14, a reproduce head 15 and a record head 16. When the tape 10 is reproduced, the magnetized sections move past the reproduce head 15 and produce a magnetic field in the head which corresponds to the pattern on the tape. A voltage is developed in the coil of head 16 resulting from the variation in magnetic flux through the coil of the head. The electrical signal corresponds to the electrical signal applied to the recording head when the signal was originally recorded on the tape. The output of the head is amplified by a voltage amplifier 17 and the amplifier is followed by equalizer 18. The output of the equalizer is fed to a volume control 19, the output of which is fed to a power amplifier 20. The output of the power amplifier drives a light source of varying intensity 21. Suitable light sources are those which are capable of instantly changing intensity with a changing applied voltage. Gas discharge lamps are preferred and incandescent light sources are not suitable. Light from the light source passes through a slit 22 and is focused on an imaging medium 23 prepared in accordance with the invention. The imaging medium may be fed from playoff reel 24 and collected on takeup wheel 25. Displaced intermediate between the imaged portion of the tape and take up reel 25 may be baths containing processing chemicals (not shown) to develop and provide a magnetic relief image.

Figure 5:
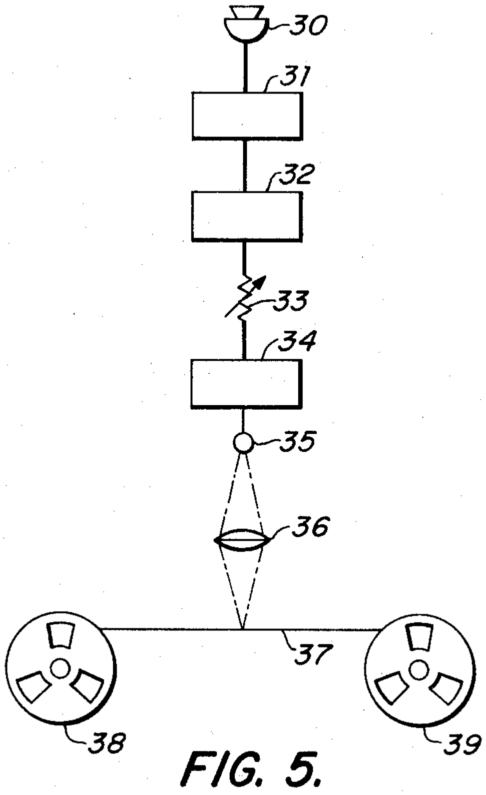
FIG. 5 is a schematic arrangement of apparatus in a complete monophonic magnetic tape recording system.

A recording may be made directly on the magnetizable storage elements of this invention by an apparatus such as that depicted in FIG. 5 of the drawings. This system is similar to that depicted in FIG. 4 except that the audio signal is received from microphone 30. The output of the microphone is amplified by voltage amplifier 31 and the amplifier is followed by an equalizer 32. The output of the equalizer is fed to a volume control 33, the output of which is fed to a power amplifier 34. The output of the power amplifier drives a light source of varying intensity 35. In this embodiment, an optical system represented by a lense 36 focuses the light on a photosensitive imaging medium 37. The imaging medium 37 is fed from playoff reel 38, is exposed and taken up on takeup reel 39. Intermediate between the point of exposure and the takeup reel may be chemical processing baths (not shown) to provide the developed photographic image.

The image medium used in the embodiments depicted in FIGS. 4 and 5 may be processed to provide a direct positive or negative image of the magnetically stored information. However, there may be substituted for the magnetizable elements 23 and 37 of FIGS. 4 and 5 respectively, photographic film that will provide a negative transparency upon exposure and development. In this instance, a magnetic information storage element having a magnetic imaged layer can be formed by exposing the imaging medium through the negative transparency using a light source of constant intensity and developing the imaging medium in a manner to provide a photographic positive magnetizable image of the original information.

Figure 6:
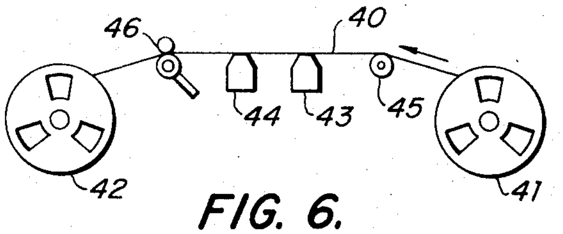
FIG. 6 represents elements of a magnetic tape recording and reproducing system for the magnetic storage element of the invention.

In FIG. 6, there is represented elements of a typical tape transfer system for reproducing the magnetic tape prepared in accordance with the invention. In the reproducing system the tape 40 is transferred from playoff reel 41 to the takeup reel 42. The tape passes over two magnetic heads — the first 43 creating a uniform magnetic field to magnetize the magnetic material and the second, 44 detecting the variations in magnetic flux from the tape and converting the same to an electrical signal. The tape in passing from playoff reel 41 passes over pulley 45, over magnetic heads 43 and 44 and between the capstan and a pressure roll 46.

The magnetic tape producing system of FIG. 6 can be modified by elimination of the magnetic head 43. In this embodiment, magnetic head 44 would generate a uniform magnetic field which is varied by passage of the magnetic tape through the field which in turn will vary the voltage in the coil of the magnetic head corresponding to the information pattern of the tape.

Figures 7, 8:
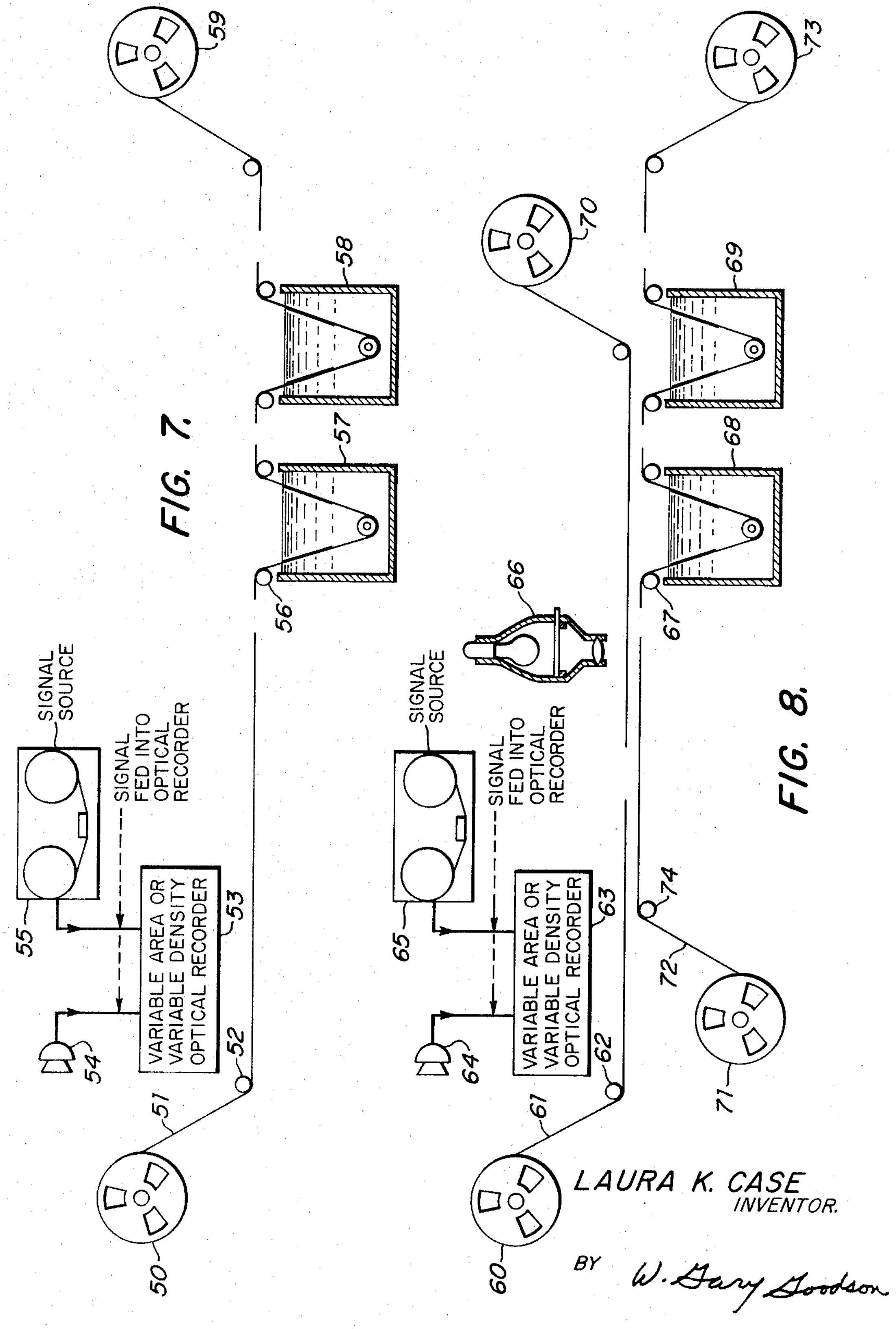
FIGS. 7 and 8 represent apparatus for providing visible magnetic image sound tapes by physical development.

FIGS. 7 and 8 illustrate methods and apparatus for producing visible magnetic images according to this invention. For example, where it is desired to produce a variable area or a variable density visible magnetic image the original sound signals are first fed into a suitable and conventional optical recorder from any suitable signal source. There are indicated in FIG. 7 by way of example a microphone 54 and a tape recorder 55 as signal sources to be fit into optical recorder 53. The optical recorder reproduces the sound signals in the form of a variable area or variable density optical pattern on a photosensitive copy medium. FIG. 8 likewise shows an optical recorder for producing an optical pattern. The photosensitive copy medium such as a film strip 51 from supply reel 50 and collected on driver or take up reel 59 is led by the optical recorder 53 where it is exposed to the variable area or variable density optical pattern to thereby form a physically developable latent image on the film strip. The film strip is then amplified by means of physical development and optionally contacted with photographic fixing or stabilizing agents and washing solutions by means of developer stations such as 57 and 58. Rollers such as 52 and 56 are used to guide the film strip and hold it closely against the optical recorder for exposure with the optical pattern. In FIG. 8 the film strip 61 from supply reel 60 and collected on driver or take up reel 70 is led over rollers such as 62 which guide the film strip and hold it in position with respect to the optical recorder 63 where the photosensitive film strip is imagewise exposed, and developed if necessary, to produce a visible optical variable area or variable density image pattern which is then guided past exposure means 66 and adjacent to film strip 72 to thereby provide a physically developable latent image on film strip 72. The film strip 72 containing the physically developable latent image is collected on driver and take up reel 73 and led between rollers such as 74 and 67 which act as guide means to hold the film in position for exposure and then physical development, and if desired fixing and washing, in developer stations 68 and 69. The physical developer utilized in FIGS. 8 and 9 comprises magnetic image forming materials in order that visible variable area or variable density magnetic images are produced.

EXAMPLE 4

A polyethylene terephthalate film having a thickness of 1.0 mils is coated with a particulate $TiO_2$ in a gelatin binder in order to provide a photosensitive emulsion layer of about 7 microns thick. An electric signal is then generated representing a wave pattern of sound to be recorded. This signal is then used to record optically a physically developable latent image of a variable area sound wave pattern on the copy medium by imagewise exposure. The film is then contacted with a solution of dilute (0.005 M) $AgNO_3$ for 10 seconds, then contacted with a Metol-citric acid reducing agent solution for 20 seconds and then rinsed with distilled water for 1 minute, thus producing a low optical density silver image. This silver image is then intensified in a cobalt plating bath for 1 and ½ hours under an atmosphere of nitrogen bubbled through the solution with the solution obtained by mixing:

four parts by volume of a 3-molar aqueous solution of cobalt chloride one part by volume of an aqueous solution of 1 percent by weight "Armac 12 D"

0.4 parts by volume of aqueous 1 percent by weight "Lissapol N"

0.6 parts by volume oxygen-free water four parts by volume of $Cr^{++}/Cr^{+++}$ solution The chromium ion solution is prepared as follows: To 100 ml of a 1.5-molar solution of chromic chloride in water containing in addition one mol of hydrochloric acid per liter were added 56.5 gm of zinc amalgam. The mixture is shaken in a machine under nitrogen. The concentration ratio $Cr^{++}/Cr^{+++}$ in the mixture thus shaken is unity.

The tape containing the variable area cobalt sound record is then exposed to a magnetic field to magnetize the metallic image portions and then is read out with a magnetic reading head. The images produced are of high resolution and have a very high resistance to deterioration.

EXAMPLE 5

A 4 mil thick polyester film base is coated with a particulate titanium dioxide dispersed in a gelatin binder. This thus coated film is then exposed for $10^{-3}$ seconds on an E. G. & G. Sensitometer with a 0.63 N.D. filter. The exposed film is then contacted with a 0.05 M aqueous silver nitrate solution for 10 seconds, contacted with a silver stabilized physical developer of the following composition for 30 seconds:

| | |
|---|---|
| Ferrous ammonium sulfate | 0.16 mole/liter |
| Ferric nitrate | 0.051 mole/liter |
| Tartaric acid | 0.43 mole/liter |
| Silver nitrate | 0.059 mole/liter |
| Armac 12D | 0.016% by weight |
| Synthrapol N | 0.016% by weight |

The physically developed film is then washed for 10 seconds in water and fixed in a 0.03 M $Na_2EDTA$ (disodiumethylenediaminetetracitric acid) containing 10 ml of concentrated ammonium hydroxide per liter of solution for 5 seconds. The film is then washed for 20 seconds in a water bath and contacted with a nickel-cobalt physical developer of the following composition:

| | |
|---|---|
| $NiSO_4 \cdot 6H_2O$ | 0.049 M |
| $CoSO_4 \cdot 7H_2O$ | 0.027 M |
| Succinic acid | 0.34 M |
| Dimethylamine borane | 6.0 gm/l |
| $NH_4OH$ to pH | 8.8 |
| Glycidol 10G — wetting agent | 10 drops/l |
| Lead acetate | 42 mg/l |

The developed sample is then washed for 60 seconds in a water bath to disclose a variable area sound track having a resolution of 70 lines per millimeter and a nickel-cobalt alloy deposited in the amount of 2.5 – 2.7 grams/m². This sound track is played through an ordinary tape recorder to give a good reproduction of an originally recorded sound which sound included singing.

EXAMPLE 6

A photoconductive zinc oxide-gelatin binder emulsion is coated on a 3 mil thick triacetate film base. This film is then exposed for $10^{-3}$ seconds on an E. G. & G. Sensitometer with a 0.63 N.D. filter. The exposed film is then contacted with a 0.005 M aqueous silver nitrate solution for 10 seconds. The film is then contacted with a silver stabilized physical developer of the composition given in Example 4 for 15 seconds. The film is then washed in a water bath for 15 seconds and contacted with the nickel-cobalt physical developer of Example 4 for 4 minutes at room temperature. The zinc oxide film has a distinct advantage over the titanium dioxide film in that the silver ion from the stabilized physical developer is much more readily removed by water and does not require an additional fixing step. Additionally the zinc oxide is dissolved from the film by the acidic physical developer thus leaving a clear background which can have significant advantages for photographic purposes or merely to get rid of a material which might catalyze degradation of the image metal upon prolonged storage.

EXAMPLE 7

The zinc oxide film of Example 5 is contacted with a silver halide 21-step exposure tablet in a vacuum frame. The film is exposed to a quartz iodide lamp from a distance of 5 feet for ½ second. After exposure the film is contacted with a 0.2 M aqueous silver nitrate solution for 5 seconds and then contacted with a stabilized silver physical developer of the composition given in Example 4 for 1 minute to give a faint image having an optical density of about 0.4. The film is then washed in a water bath for 1 minute and contacted with a nickel physical developer of the following composition:

| Material | Concentration, gms/liter |
|---|---|
| $NiSO_4$ $6H_2O$ | 26.3 |
| $(NH_4)_2$ $SO_4$ | 13.2 |
| $NaH_2PO_2H_2O$ | 5.0 |
| Dimethyl amine borane | 7.5 |
| Glycidol G — wetting agent | .5 |
| pH adjusted to 7.5 with $NH_4OH$ | |

In about 2 minutes of contact with the nickel physical developer, the faint silver image is converted to a dense black nickel image with a maximum density of about 4.7 and a gamma of 6.

I claim:

1. The process of making a magnetic record photographically consisting essentially of exposing a photosensitive copy medium comprising a photoconductor and a binder imagewise to a pattern of activating radiation corresponding to a magnetically readable image to produce a physically developable image of catalytic nuclei and contacting this copy medium with a physical developer comprising chemically reactive, magnetizable image forming material comprising a solution of metal ions which reacts selectively to amplify the physically developable image to a visible magnetically readable image.

2. The process of claim 1 wherein the photosensitive copy medium comprises a flexible support having a thickness less than about 2.5 mils.

3. The process of claim 1 wherein the photosensitive copy medium comprises a support having a thickness less than about 1.5 mils coated with a photographic emulsion comprising as the photosensitive photoconductor material at least one member selected from the group consisting of silver halide and a metal oxide.

4. The process of claim 1 wherein the photosensitive photoconductor material is zinc oxide.

5. The process of making a combined photographic record of a visual image and a magnetically readable image consisting essentially of exposing a photosensitive copy medium comprising a photosensitive photoconductor and a binder imagewise to a pattern of activating radiation corresponding to a visual image, exposing the photosensitive copy medium imagewise to a pattern of activating radiation corresponding to an image capable of being read-out magnetically, and contacting this copy medium with chemically reactive image forming materials comprising a solution of metal ions which react selectively to form images corresponding to the patterns of activating radiation the visual image produced being capable of visual read-out and the magnetizable image being capable of magnetic read-out.

6. The process of claim 5 wherein the photosensitive copy medium comprises a flexible support coated with a photoconductor and a gelatin or polyvinyl alcohol binder and wherein the visual image is produced by exposure and development at times different than the exposure and development of the magnetizable image.

7. The process of claim 5 wherein at least one of the images selected from the group consisting of the visual image and the magnetizable image is a continuous tone image.

8. The process of claim 5 wherein both the visual and magnetizable images are continuous tone images.

9. The process of claim 5 wherein the two exposures are conducted simultaneously.

10. The process of claim 9 wherein the copy medium comprises a flexible film support and wherein the magnetizable image comprises at least one member selected from the group consisting of a variable area magnetic image and a variable density magnetic image.

11. The process of claim 10 wherein the photosensitive copy medium comprises as the photosensitive photoconductor materials at least one member selected from the group consisting of silver halide and a metal oxide.

12. A method of making a magnetic tape consisting essentially of (1) generating an electrical signal representing the wave pattern of the sound to be recorded, (2) using the signal to generate an image pattern of activating radiation, (3) exposing a photosensitive layer comprising a photoconductor and a binder to thereby generate sites which are capable of physical development, and (4) contacting the copy medium wih a physical developer containing magnetizable image forming materials comprising a solution of metal ions to produce a magnetizable image of the sound wave pattern.

13. An apparatus for making a magnetic tape consisting essentially of (1) means for generating an electrical signal representing the wave pattern of the sound to be recorded, (2) means for using the signal to generate an image pattern of activating radiation, (3) means for exposing a photosensitive layer comprising a photoconductor and a binder to thereby generate sites which are capable of physical development, and (4) means for contacting the copy medium with a physical developer containing magnetizable image forming materials to produce a magnetizable image of the sound wave pattern.

* * * * *